(12) United States Patent
Ohmura (10) Patent No.: US 11,322,998 B2
(45) Date of Patent: May 3, 2022

(54) ROTOR, MOTOR, AND METHOD FOR MANUFACTURING ROTOR

(71) Applicant: MINEBEA MITSUMI Inc., Nagano (JP)

(72) Inventor: Jun Ohmura, Hamamatsu (JP)

(73) Assignee: MINEBEA MITSUMI Inc., Nagano (JP)

( * ) Notice: Subject to any disclaimer, the term of this patent is extended or adjusted under 35 U.S.C. 154(b) by 161 days.

(21) Appl. No.: 16/964,776

(22) PCT Filed: Aug. 27, 2018

(86) PCT No.: PCT/JP2018/031597
§ 371 (c)(1),
(2) Date: Jul. 24, 2020

(87) PCT Pub. No.: WO2019/150630
PCT Pub. Date: Aug. 8, 2019

(65) Prior Publication Data
US 2021/0057947 A1    Feb. 25, 2021

(30) Foreign Application Priority Data

Jan. 31, 2018    (JP) .............................. JP2018-014643

(51) Int. Cl.
*H02K 1/30* (2006.01)
*B23P 19/02* (2006.01)
(Continued)

(52) U.S. Cl.
CPC ................ *H02K 1/30* (2013.01); *B23P 19/02* (2013.01); *H02K 1/2733* (2013.01); *H02K 7/04* (2013.01); *H02K 15/03* (2013.01); *H02K 15/165* (2013.01)

(58) Field of Classification Search
USPC ............ 310/156.08, 156.12, 156.13, 156.28, 310/156.29, 91, 261.1
See application file for complete search history.

(56) References Cited

U.S. PATENT DOCUMENTS 5,200,662 A * 4/1993 Tagami ................ H02K 1/2773
310/43
5,627,423 A * 5/1997 Marioni ................ H02K 15/12
310/156.23
(Continued)

FOREIGN PATENT DOCUMENTS

CN    105305680 A    2/2016
CN    101099287 A    1/2018
(Continued)

OTHER PUBLICATIONS

International Search Report for corresponding International Application No. PCT/JP2018/031597 dated Nov. 20, 2018.
(Continued)

*Primary Examiner* — Tran N Nguyen
(74) *Attorney, Agent, or Firm* — Pearne & Gordon LLP

(57) ABSTRACT

A rotor according to an embodiment includes a cylindrical magnet, a holder, and a balance adjusting portion. The cylindrical magnet has a bore portion into which a rotary shaft is inserted, the inner diameter of the bore portion being larger than the outer diameter of the rotary shaft. The holder is made of resin, and has a tubular portion formed in the bore portion of the magnet and a protruding portion protruding from the magnet in the rotation axis direction, the holder being press-fitted onto the rotary shaft. The balance adjusting portion is press-fitted onto the rotary shaft with the protruding portion interposed therebetween.

10 Claims, 7 Drawing Sheets

(51) Int. Cl.
    *H02K 1/2733*     (2022.01)
    *H02K 7/04*     (2006.01)
    *H02K 15/03*     (2006.01)
    *H02K 15/16*     (2006.01)

(56) References Cited

U.S. PATENT DOCUMENTS

| | | |
|---|---|---|
| 2008/0084125 A1 | 4/2008 | Ohkawa et al. |
| 2009/0108686 A1* | 4/2009 | Jeung ................ H02K 1/30 310/43 |
| 2012/0062050 A1 | 3/2012 | Horng et al. |
| 2015/0084464 A1 | 3/2015 | Ramdane |
| 2015/0364960 A1 | 12/2015 | Arimatsu |
| 2018/0175684 A1 | 6/2018 | Arimatsu |

FOREIGN PATENT DOCUMENTS

| | | |
|---|---|---|
| JP | 06-284611 A | 10/1994 |
| JP | 2007-135332 A | 5/2007 |
| JP | 2015-070786 A | 4/2015 |

OTHER PUBLICATIONS

Written Opinion for corresponding International Application No. PCT/JP2018/031597 dated Nov. 20, 2018.
Decision to Grant a Patent dated Sep. 28, 2021 for corresponding Japanese Application No. 2018-014643 and English translation.
English translation of the Written Opinion for corresponding International Application No. PCT/JP2018/031597 dated Nov. 20, 2018.
First Office Action dated Jan. 19, 2022 for corresponding Chinese Application No. 201880086923.X and English translation.

* cited by examiner

ROTOR, MOTOR, AND METHOD FOR MANUFACTURING ROTOR

FIELD

The present invention relates to a rotor, a motor, and a method for manufacturing a rotor.

BACKGROUND

Conventionally, some rotors in rotating electrical machine such as motors have been configured each with a rotary shaft inserted into a bore portion of a cylindrical magnet.

CITATION LIST

Patent Literature

Patent Literature 1: Japanese Laid-open Patent Publication No. 2007-135332

SUMMARY

Technical Problem

When the magnet and the rotary shaft are fixed to each other, it is common that adhesive is applied therebetween to adhere and fix them or the magnet is press-fitted onto the rotary shaft to be fixed thereto.

However, for example, when adhesive is used for the fixing, the respective central axes of the magnet and the rotary shaft may be misaligned with each other, and consequently both may be fixed in an eccentric manner. When the magnet is press-fitted onto the rotary shaft to be fixed thereto, a surface of the rotary shaft may be damaged during insertion, or the magnet itself may break if it is a sintered magnet, for example.

The present invention has been made in view of the above-described circumstances, and an object of the present invention is to provide a rotor, a motor, and a method for manufacturing a rotor that enable a magnet to be fixed to a rotary shaft with high concentricity while preventing members from breaking.

Solution to Problem

It is an object of the present invention to solve the problems in the conventional technology. A rotor according to an embodiment includes a cylindrical magnet, a holder, and a fixed portion. The cylindrical magnet has a bore portion into which a rotary shaft is inserted, the inner diameter of the bore portion being larger than the outer diameter of the rotary shaft. The holder is made of resin, and has a tubular portion formed in the bore portion of the magnet and a protruding portion protruding from the magnet in a rotation axis direction, the holder being press-fitted onto the rotary shaft. The fixed portion is press-fitted onto the rotary shaft with the protruding portion interposed therebetween.

Advantageous Effects of Invention

According to an aspect of the present invention, the rotor, a motor, and a method for manufacturing a rotor can be provided that enable the magnet to be fixed to the rotary shaft with high concentricity while preventing members from breaking.

DESCRIPTION OF EMBODIMENTS

A rotor, a motor, and a method for manufacturing a rotor according to an embodiment will now be described with reference to the drawings. Herein, dimensional relations among elements, ratios of the elements, and the like in the drawings may be different from the actual ones. Furthermore, dimensional relations or ratios of the same portions may be different between the drawings. Hereinafter, as an example of the motor, a brushless motor of an inner rotor type will be described.

Figure 1:
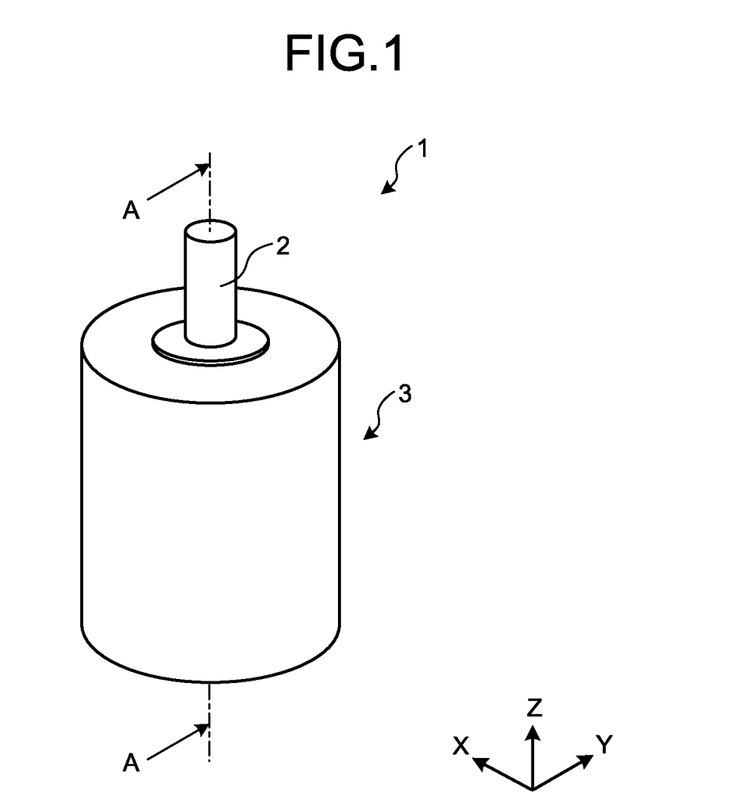
FIG. 1 is a perspective view of a motor according to an embodiment.

The appearance of the motor according to the embodiment will be described first with reference to FIG. 1. FIG. 1 is a perspective view of a motor 1 according to the embodiment.

As illustrated in FIG. 1, the motor 1 according to the embodiment includes a rotary shaft 2 and a case portion 3. The rotary shaft 2 is provided so as to extend at a position passing through the central axis of the case portion 3 having a cylindrical shape and protrude from the case portion 3 toward a positive side of a Z-axis direction that is the axial direction thereof. Hereinafter, the Z-axis direction in which the rotary shaft 2 extends is referred to as a rotation axis direction. In each drawing, a three-dimensional rectangular coordinate system including the Z-axis is illustrated for the description to be easily understood.

Figure 2:
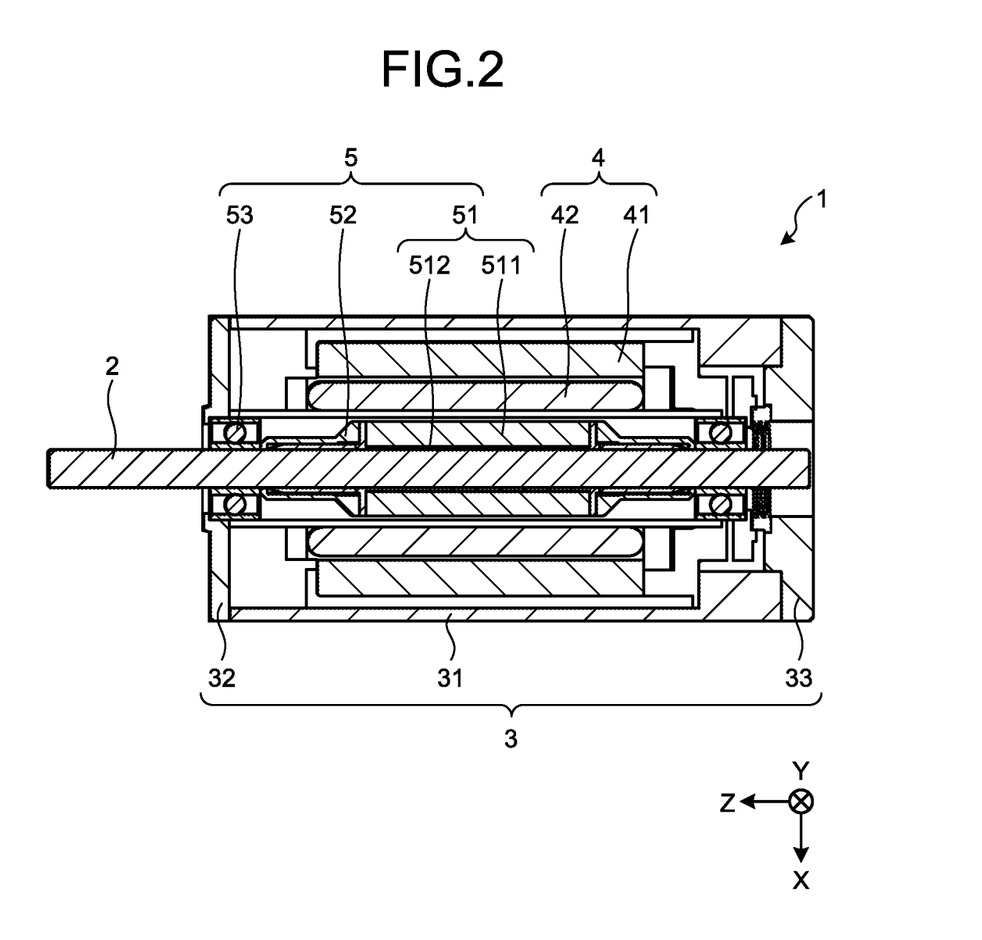
FIG. 2 is a sectional view of the motor according to the embodiment.

The case portion 3 is a housing having a substantially cylindrical shape, and accommodates a stator 4 and a rotor 5 therein, for example, described later. Referring to FIG. 2, the following describes an internal structure of the case portion 3 in the motor 1.

FIG. 2 is a sectional view of the motor 1 according to the embodiment. In FIG. 2, a cross-section of the motor 1 taken along line A-A in FIG. 1 is illustrated. As illustrated in FIG. 2, the motor 1 includes the stator 4 and the rotor 5.

As illustrated in FIG. 2, the stator 4 and the rotor 5 are accommodated inside the case portion 3 by a body portion 31, a first cap 32, and a second cap 33 of the case portion 3.

The stator 4 is a stationary component of the motor 1, and includes: a cylindrical stator core 41 that is formed by stacking a plurality of plate-shaped metal members such as soft magnetic steel plates, for example, silicon steel sheets or magnetic steel sheets; and a coil 42 that is wound around teeth (not illustrated) included in the stator core 41.

The rotor 5 is a rotary component of the motor 1, and includes a magnet unit 51, balance adjusting portions 52 (one example of fixed portions), and bearing portions 53. The magnet unit 51 includes a magnet 511 and a holder 512. The magnet 511 is, for example, a cylindrical permanent magnet and, for example, a sintered magnet such as a ferrite magnet or a neodymium magnet may be used therefor. Specifically, the inner diameter of a bore portion of the magnet 511 into which the rotary shaft 2 is inserted is larger than the outer diameter of the rotary shaft 2.

The holder 512 is made of resin, for example, and is formed integrally with the magnet 511 to fix the magnet 511. Details of the holder 512 will be described later.

The balance adjusting portions 52 are provided to both ends of the magnet 511 in the rotation axis direction, and are used for adjusting the rotational balance of the rotor 5. Specifically, regarding the balance adjusting portions 52, the rotational balance is adjusted by shaving outer peripheral surfaces thereof on the basis of imbalance of rotation that is measured in advance by a test, for example. Details of the balance adjusting portions 52 will be described later.

A pair of the bearing portions 53 are provided in a press-fitted manner at such positions that the magnet unit 51 and the balance adjusting portions 52 are interposed therebetween in the Z-axis direction that is the rotation axis direction, and rotatably support the rotary shaft 2. With this configuration, the magnet 511 and the balance adjusting portions 52 can be prevented from being displaced in the rotation axis direction. For example, the bearing portions 53 can be configured with rolling bearings such as ball bearings, but are not limited to them, and may be configured with other structures such as plain bearings and magnetic bearings.

When a magnet and a rotary shaft are fixed to each other, it is common that adhesive is applied therebetween to adhere and fix them or the magnet is press-fitted onto the rotary shaft to be fixed thereto.

However, for example, when adhesive is used for the fixing, the respective central axes of the magnet and the rotary shaft may be misaligned with each other, and consequently both may be fixed in an eccentric manner. When the magnet is press-fitted onto the rotary shaft to be fixed thereto, a surface of the rotary shaft may be damaged during insertion, or the magnet itself may break if it is a sintered magnet, for example.

In view of this, in the motor 1 according to the embodiment, the holder 512 made of resin is interposed between the magnet 511 and the rotary shaft 2. Specifically, the magnet unit 51 formed integrally with the magnet 511 and the holder 512 is manufactured in advance, and this magnet unit 51 is press-fitted onto the rotary shaft 2. In other words, the magnet unit 51 and the rotary shaft 2 are fixed to each other in such a manner that the bore diameter of the magnet unit 51 is smaller than the outer diameter of the rotary shaft 2 (also called "interference fit").

With this configuration, the magnet 511 and the rotary shaft 2 can be prevented from being eccentric. Furthermore, because the holder 512 made of resin is interposed between the magnet 511 and the rotary shaft 2, a surface of the rotary shaft 2 is not damaged during insertion and the magnet 511 does not break. In other words, with the motor 1 according to the embodiment, the magnet 511 can be fixed to the rotary shaft 2 with high concentricity while preventing members from breaking.

Figure 3:
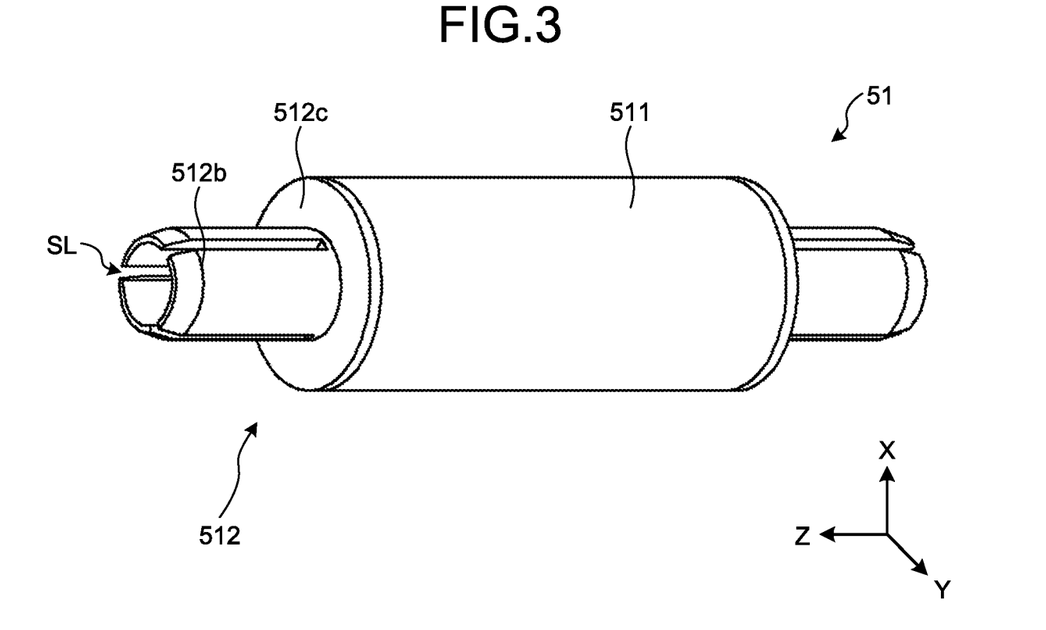
FIG. 3 is a perspective view of a magnet unit according to the embodiment.
Figure 4:
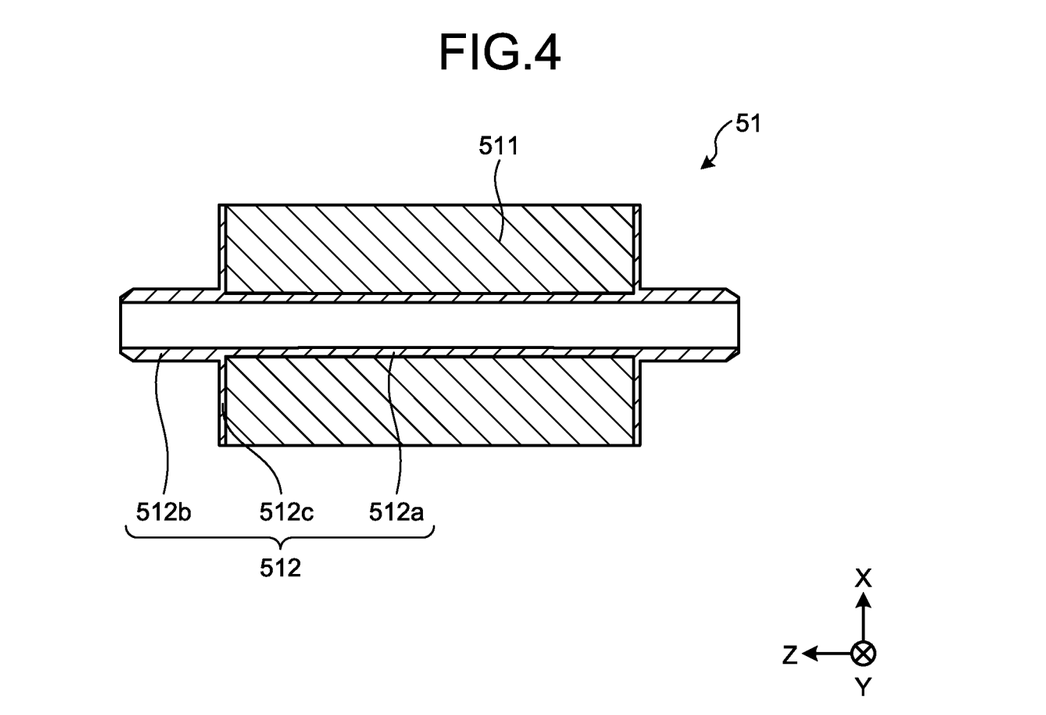
FIG. 4 is a sectional view of the magnet unit according to the embodiment.
Figure 5:
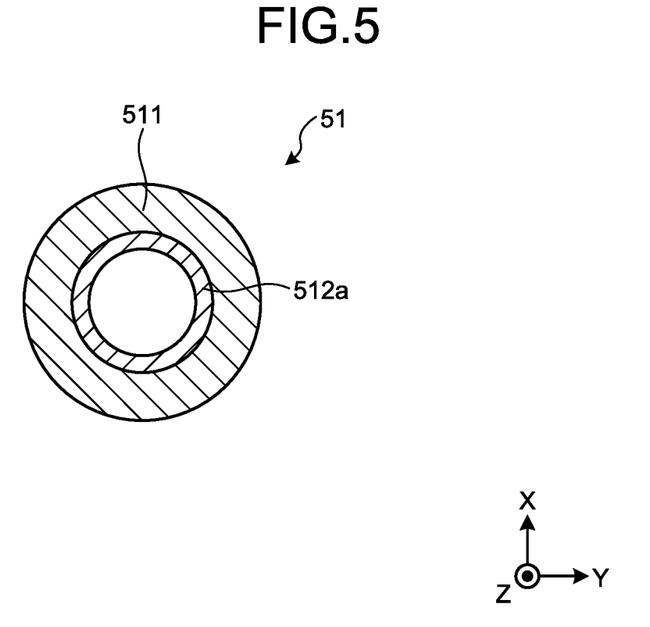
FIG. 5 is a sectional view of the magnet unit according to the embodiment.

With reference to FIG. 3 to FIG. 5, the magnet unit 51 according to the embodiment will be described in detail. FIG. 3 is a perspective view of the magnet unit 51 according to the embodiment. FIG. 4 and FIG. 5 are sectional views of the magnet unit 51 according to the embodiment.

As illustrated in FIG. 3 to FIG. 5, the holder 512 includes a tubular portion 512a, protruding portions 512b, and flange portions 512c. The tubular portion 512a, the protruding portions 512b, and the flange portions 512c are integrally formed of material made of resin. Herein, the tubular portion 512a, the protruding portions 512b, and the flange portions 512c may be each formed of separate members.

The tubular portion 512a is provided in the bore portion of the magnet 511, and is fixed to the rotary shaft 2 in such a manner that the tubular portion 512a presses the rotary shaft 2. Specifically, the inner diameter of the tubular portion 512a is the same as or slightly smaller than the outer diameter of the rotary shaft 2.

The inner peripheral surface of the tubular portion 512a (including the inner peripheral surfaces of the protruding portions 512b) has a surface shape that is smoother than the surface of the bore portion of the magnet 511. In other words, a surface of the holder 512 facing the rotary shaft 2 has a surface roughness degree lower than that of the bore portion of the magnet 511. The surface roughness degree is a parameter that represents a surface roughness.

By making the inner peripheral surface of the holder 512 smooth in this manner, the rotary shaft 2 can be prevented from being damaged during insertion. By using material for the holder 512 such as resin material having a hardness lower than that of the rotary shaft 2, the rotary shaft 2 can be further prevented from being damaged.

Each protruding portion 512b is a part to be inserted into the corresponding balance adjusting portion 52 described later. Specifically, the protruding portion 512b can be bent in a radial direction of the rotary shaft 2. With this configuration, when the magnet unit 51 is inserted onto the rotary shaft 2, the protruding portion 512b is bent outward, whereby this insertion step can be easily performed.

More specifically, as illustrated in FIG. 3, the protruding portion 512b has a plurality of slits SL that are aligned at predetermined intervals in the circumferential direction of the rotary shaft 2. In other words, the slits SL are notches that are recessed toward a negative side of the Z-axis direction that is the rotation axis direction from the protruding portion 512b toward the corresponding flange portion 512c described later.

By forming the slits SL in this manner, a capability of bending can be imparted to the protruding portion 512b without adding a new member.

In the example illustrated in FIG. 3, a case is illustrated in which three slits SL are formed at regular intervals (120-degrees intervals). With this configuration, the protruding portion 512b can be pressed evenly against the outer peripheral surface of the rotary shaft 2, and thus breakage of the protruding portion 512b due to being pressed unevenly can be reduced. Herein, the number of the slits SL is not limited to three, and may be two or may be four or more. Widths, depths, shapes of the respective slits SL may be all the same, or may be different from each other.

In the example illustrated in FIG. 3, the protruding portion 512b is configured to be capable of being bent by being provided with the slits SL. However, it is not limited to the slits SL that makes the protruding portion 512b bendable.

For example, the protruding portion 512b may be formed to have such a shape that the thickness thereof is smaller at a position more separated apart from the magnet 511 (also called "tapered shape"), and may thus have a shape that can be deformed by pressing force of the balance adjusting portion 52 described later.

The flange portions 512c are members configured to restrict movement of the magnet 511 in the rotation axis direction. With this configuration, the magnet 511 can be prevented from being displaced in the rotation axis direction. The flange portions 512c do not necessarily have to be provided, and may be omitted.

As described above, the magnet unit 51 is integrally formed. Specifically, the magnet unit 51 is manufactured by attaching a mold having a shape corresponding to the contour of the holder 512 to the cylindrical magnet 511 manufactured in advance, injecting resin into the mold, and curing the resin by a predetermined process.

In the example illustrated in FIG. 5, a case is illustrated in which the magnet 511 has a ring shape, but the shape thereof is not limited to this. For example, the magnet 511 may be formed of segment magnets such as interior permanent magnets (IPM), and may have any desired shape if it is tubular.

Figure 6:
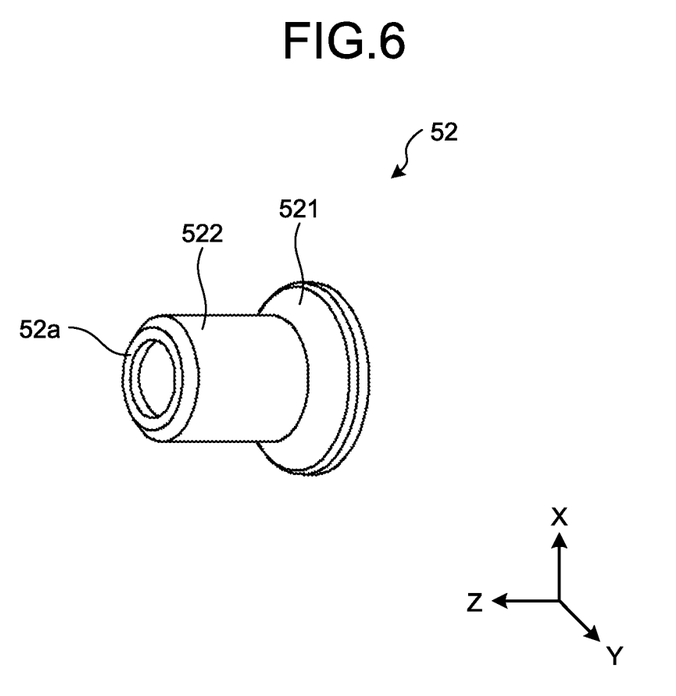
FIG. 6 is a perspective view of a balance adjusting portion according to the embodiment.

Referring to FIG. 6, the following describes each balance adjusting portion 52. FIG. 6 is a perspective view of the balance adjusting portion 52 according to the embodiment. As illustrated in FIG. 6, the balance adjusting portion 52 includes an adjusting portion 521 (one example of an adjustment part) and a fitting portion 522.

The adjusting portion 521 is an adjustment part for adjusting the rotational balance of the rotor 5, and is made of, for example, metallic material such as brass or stainless steel. Specifically, the adjusting portion 521 has a tapered shape that tapers down toward the fitting portion 522, and the part having this tapered shape is formed so as to have a large thickness. In other words, forming the adjusting portion 521 to have a large thickness increases the amount to be shaved, thereby allowing the adjustment range for rotational balance to increase.

The fitting portion 522 is a part to be fitted onto the corresponding protruding portion 512b of the holder 512. Specifically, the fitting portion 522 of the balance adjusting portion 52 presses the rotary shaft 2 with the protruding portion 512b of the holder 512 interposed therebetween, and the fitting portion 522 fixes the balance adjusting portion 52 to the rotary shaft 2.

The diameter of the bore of the balance adjusting portion 52 on the side of a distal-end portion 52a that is one end thereof is smaller than the diameter of the bore on the side of the other end. The distal-end portion 52a is preferably in a state of not being in contact with the rotary shaft 2, and furthermore a gap between the distal-end portion 52a and the rotary shaft 2 is preferably as small as possible.

The distal-end portion 52a can be considered as a bent portion that is bent inward in the radial direction of the rotary shaft 2. The distal-end portion 52a is a part that is in contact with an inner ring of the bearing portion 53 if it is a ball bearing. In other words, bending the distal-end portion 52a allows the distal-end portion 52a to have a larger area that is in contact with the inner ring of the bearing portion 53, and thus the distal-end portion 52a can be applicable to bearing portions 53 having various widths of the inner ring. Furthermore, the distal-end portion 52a can increase in strength by being bent.

In FIG. 6, a case is illustrated in which the adjusting portion 521 and the fitting portion 522 of the balance adjusting portion 52 are integrally formed. However, the adjusting portion 521 and the fitting portion 522 may be configured as separate members.

Figure 7:
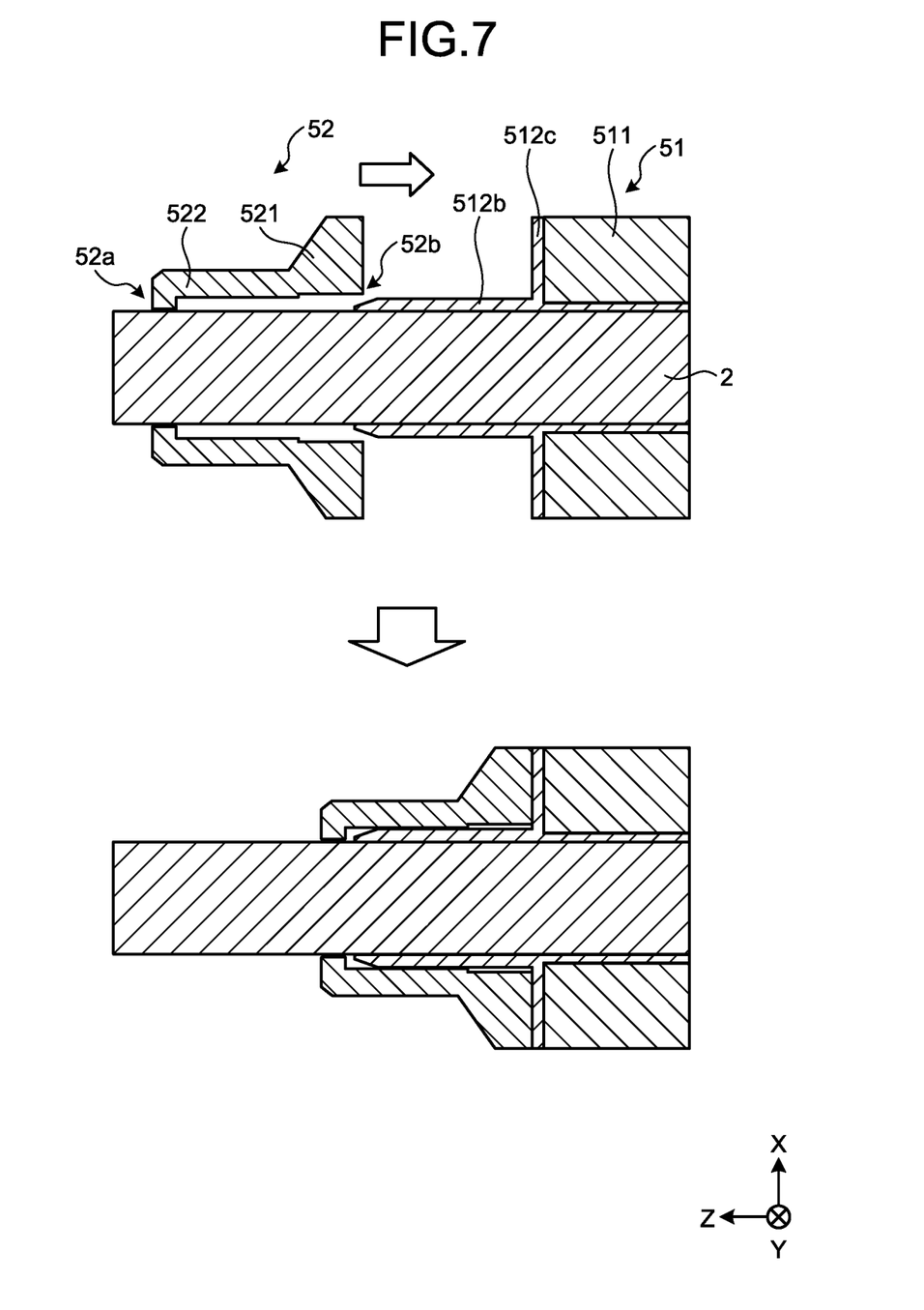
FIG. 7 is a diagram illustrating a state in which the magnet unit and the balance adjusting portion are mounted.

Referring to FIG. 7, the following describes mounting of the magnet unit 51 and each balance adjusting portion 52. FIG. 7 is a diagram illustrating a state when the magnet unit 51 and the balance adjusting portion 52 are mounted. In FIG. 7, a case is illustrated in which the balance adjusting portion 52 is mounted in a state in which the magnet unit 51 has been mounted on the rotary shaft 2. A state before the mounting is illustrated in the upper part of FIG. 7, and a state after the mounting is illustrated in the lower part thereof.

As illustrated in FIG. 7, the balance adjusting portion 52 has a stepped part 52b on an inner peripheral surface thereof facing the rotary shaft 2. Specifically, the stepped part 52b is formed in the bore of the balance adjusting portion 52 on the adjusting portion 521 side.

The protruding portion 512b of the holder 512 has a tapered shape having a distal end that is one end thereof on the balance adjusting portion 52 side and tapers down. In other words, as illustrated in the upper part of FIG. 7, when the magnet unit 51 is inserted into the balance adjusting portion 52, insertion can be facilitated by the stepped part 52b and the tapered part of the protruding portion 512b, whereby the protruding portion 512b can be prevented from breaking during manufacturing. In FIG. 7, the stepped part 52b is illustrated as one example. However, for example, this part may have a tapered shape having a bore diameter that becomes smaller toward the distal-end portion 52a.

As illustrated in the lower part of FIG. 7, the balance adjusting portion 52 is inserted to a position where the adjusting portion 521 comes into contact with one of the flange portions 512c. Thus, the balance adjusting portion 52 is fixed in such a manner that the fitting portion 522 presses the rotary shaft 2 with the protruding portion 512b of the holder 512 interposed therebetween.

In FIG. 7, a case is illustrated in which the balance adjusting portion 52 is inserted onto the holder 512 to be fixed at a position where the adjusting portion 521 comes into contact with the flange portion 512c. However, the balance adjusting portion 52 may be fixed in such a manner that the adjusting portion 521 and the flange portion 512c are separated from each other.

In FIG. 7, the balance adjusting portion 52 is fixed in such a manner that the distal-end portion 52a is separated from the distal end of the protruding portion 512b of the holder 512. However, the balance adjusting portion 52 may be fixed in such a manner that the distal-end portion 52a is in contact with the distal end of the protruding portion 512b of the holder 512. In this case, the distal-end portion 52a can be considered to function as a stopper for the protruding portion 512b.

In the upper part of FIG. 7, a state is illustrated in which the protruding portion 512b of the holder 512 and the rotary shaft 2 are in contact with each other in a stage before the balance adjusting portion 52 is mounted. However, the protruding portion 512b and the rotary shaft 2 may be in a state of being separated from each other. In other words, the protruding portion 512b that is floating to be separate from the rotary shaft 2 receives pressing force of the fitting portion 522 when the balance adjusting portion 52 is inserted. Thus, the protruding portion 512b is brought into contact with the rotary shaft 2.

Figure 8:
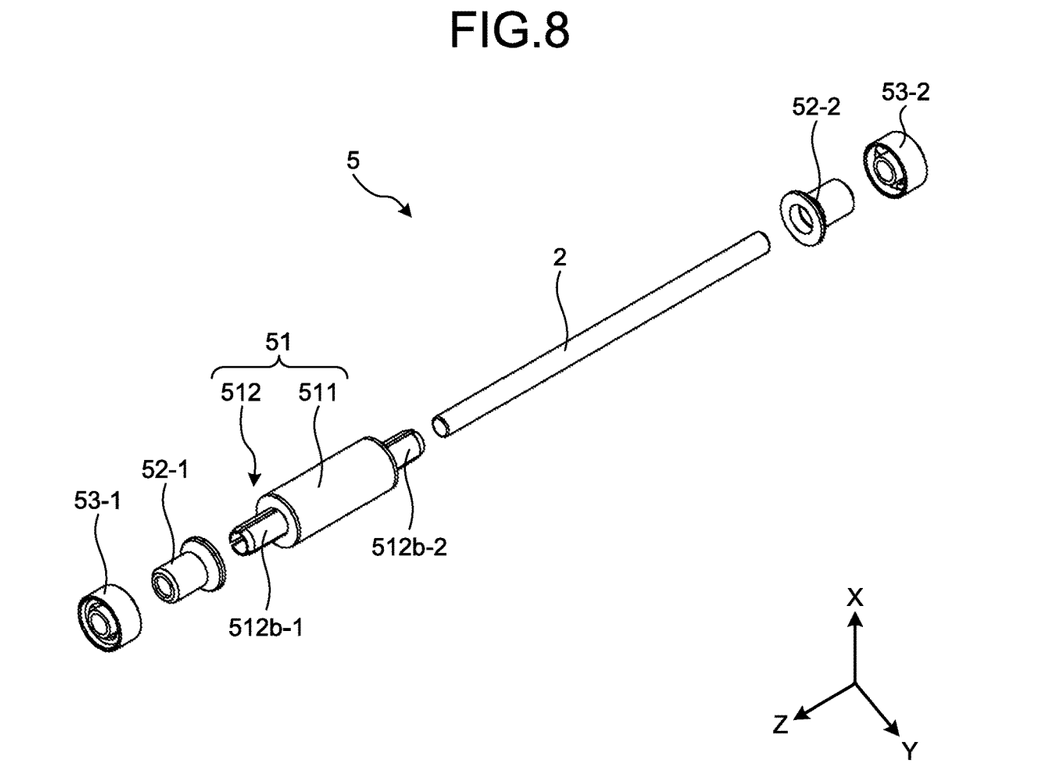
FIG. 8 is an exploded perspective view of a rotor according to the embodiment.
Figure 9:
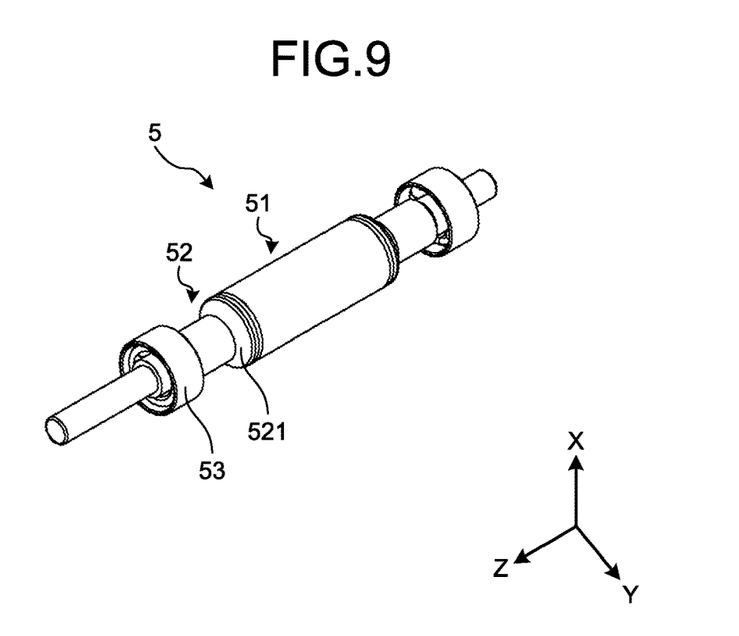
FIG. 9 is a perspective view of the rotor according to the embodiment.

Referring to FIG. 8 and FIG. 9, the following describes a method for manufacturing the rotor 5 according to the embodiment. FIG. 8 is an exploded perspective view of the rotor 5 according to the embodiment. FIG. 9 is a perspective view of the rotor 5 according to the embodiment. The following is based on the premise that the magnet unit 51 has been manufactured in advance by the above-described manufacturing method.

In the method for manufacturing the rotor 5 according to the embodiment, to begin with, the magnet unit 51 is inserted onto the rotary shaft 2 (magnet-unit press-fitting step). The magnet unit 51 inserted onto the rotary shaft 2 is fixed thereto in such a manner that the holder 512 press-fits the rotary shaft 2.

Subsequently, with the magnet unit 51 being positioned so as not to be displaced in the rotation axis direction, one balance adjusting portion 52-2 of a pair of balance adjusting portions 52-1, 52-2 is press-fitted onto the corresponding protruding portion 512*b*-2 of the holder 512. Thus, movement of the magnet unit 51 toward the negative side in the Z-axis direction is restricted (fixed-portion press-fitting step).

Subsequently, the other balance adjusting portion 52-1 is inserted onto the corresponding protruding portion 512*b*-1 from the positive side in the Z-axis direction to a position where the balance adjusting portion 52-1 press-fits the corresponding protruding portion 512*b*-1 of the holder 512 (fixed-portion press-fitting step). Thus, movement of the magnet unit 51 toward the positive side in the Z-axis direction is restricted.

Subsequently, a pair of bearing portions 53-1, 53-2 is inserted onto the rotary shaft 2 so as to be press-fitted at positions to interpose the magnet unit 51 and the pair of balance adjusting portions 52-1, 52-2 therebetween, and thus manufacture of the rotor 5 illustrated in FIG. 9 is completed.

The rotational balance of the completed rotor 5 illustrated in FIG. 9 is measured. If imbalance is found, an outer peripheral surface of the adjusting portion 521 that is an exposed portion in each balance adjusting portion 52 is shaved to correct the imbalance.

As described above, the rotor 5 according to the embodiment includes the cylindrical magnet 511, the holder 512, and the fixed portions (balance adjusting portions 52). The inner diameter of the bore portion of the cylindrical magnet 511 into which the rotary shaft 2 is inserted is larger than the outer diameter of the rotary shaft 2. The holder 512 is made of resin, and has the tubular portion 512*a* provided in the bore portion of the magnet 511 and the protruding portions 512*b* protruding from the magnet 511 in the rotation axis direction, the holder 512 being press-fitted onto the rotary shaft 2. Each fixed portion is press-fitted onto the rotary shaft 2 with the corresponding protruding portion 512*b* of the holder 512 interposed therebetween.

With this configuration, the magnet 511 and the rotary shaft 2 can be prevented from being eccentric. Furthermore, because the holder 512 made of resin is interposed between the magnet 511 and the rotary shaft 2, the surface of the rotary shaft 2 is not damaged during insertion and the magnet 511 does not break. In other words, with the motor 1 according to the embodiment, the magnet 511 can be fixed to the rotary shaft 2 with high concentricity while preventing members from breaking.

As for the magnet unit 51 according to the embodiment described above, a case has been illustrated in which the magnet 511 and the holder 512 are integrally formed. However, the magnet 511 and the holder 512 do not have to be integrally formed. This point will be described with reference to FIG. 10.

Figure 10:
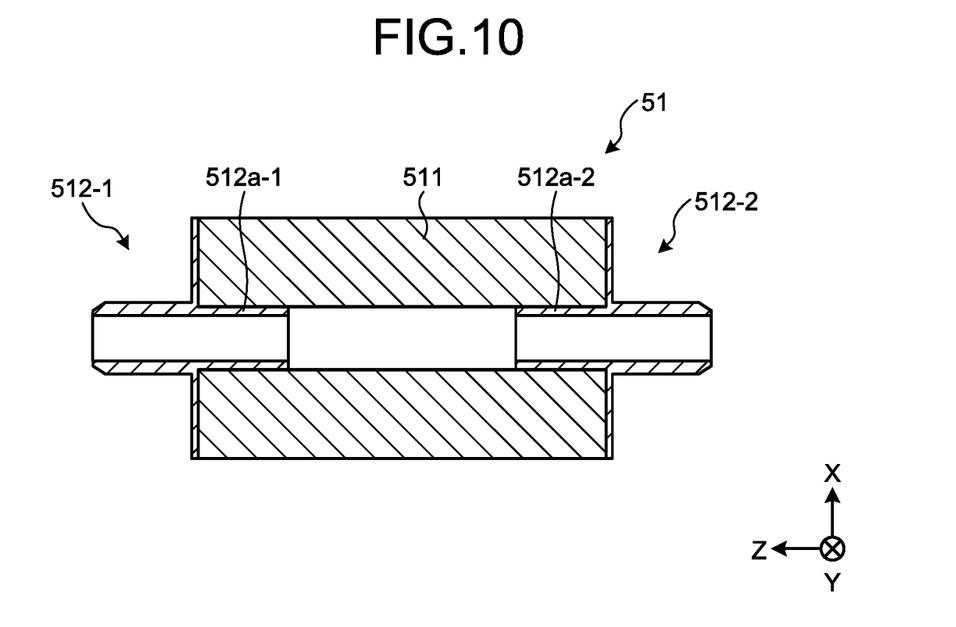
FIG. 10 is a sectional view of a magnet unit according to a modification.

FIG. 10 is a sectional view of a magnet unit 51 according to a modification. As illustrated in FIG. 10, the magnet unit 51 according to the modification includes two holders 512-1, 512-2.

Specifically, the two holders 512-1, 512-2 are fixed at positions to interpose the magnet 511 therebetween in the rotation axis direction. More specifically, when the magnet unit 51 is fixed to the rotary shaft 2, one holder 512-1 is inserted onto the rotary shaft 2 from the positive side in the Z-axis direction first, and is press-fitted onto the rotary shaft 2. Subsequently, the magnet 511 is inserted onto the rotary shaft 2 from the negative side in the Z-axis direction, and is press-fitted onto the tubular portion 512*a*-1 of the holder 512-1. Subsequently, the other holder 512-2 is inserted onto the rotary shaft 2 from the negative side in the Z-axis direction, and the tubular portion 512*a*-2 thereof is press-fitted into the magnet 511. Thus, the magnet unit 51 is fixed to the rotary shaft 2.

In other words, by configuring the holders 512-1, 512-2 as two separate members, the magnet unit 51 can be manufactured without integrally forming them.

In the example illustrated in FIG. 10, a case is illustrated in which the two tubular portions 512*a*-1, 512*a*-2 are separated from each other in the rotation axis direction. However, the two tubular portions 512*a*-1, 512*a*-2 may be in contact with each other. In other words, when the two tubular portions 512*a*-1, 512*a*-2 are in contact with each other, the whole bore portion of the magnet 511 is covered by the two tubular portions 512*a*-1, 512*a*-2.

When the two tubular portions 512*a*-1, 512*a*-2 are separated from each other, that is, when the bore portion of the magnet 511 is partially covered by the tubular portions 512*a*-1, 512*a*-2, it is preferable that the lengths of the respective tubular portions 512*a*-1, 512*a*-2 in the rotation axis direction be substantially the same. With this configuration, the rotational balance of the rotor 5 can be prevented from being lost.

In the above-described embodiment, both of a surface of the fitting portion 522 of each balance adjusting portion 52 and a surface of the protruding portion 512*b* of the corresponding holder 512 that face each other are flat surfaces each having no projections or depressions. However, these surfaces are not limited to this.

For example, both of the surface of the fitting portion 522 of the balance adjusting portion 52 and the surface of the protruding portion 512*b* of the holder 512 that face each other may be formed so as to have a spiral projection and a depression corresponding to the projection like a relation between a bolt and a nut. In other words, the fitting portion 522 of the balance adjusting portion 52 may be fixed to the rotary shaft 2 by being fastened to the protruding portion 512*b* of the holder 512. With this configuration, the balance adjusting portion 52 can be prevented from falling off in the rotation axis direction.

The present invention is not limited to the above-described embodiment. The present invention also includes appropriate combinations of components described above. Further effects and modifications could be easily thought of by the skilled person in the art. Thus, a wider aspect of the present invention is not limited to the above-described embodiment but may include various changes.

REFERENCE SIGNS LIST

1 motor
2 rotary shaft
3 case portion
4 stator
5 rotor
31 body portion
32 first cap
33 second cap
41 stator core
42 coil
51 magnet unit 52, 52-1, 52-2 balance adjusting portion (one example of a fixed portion)
52a distal-end portion
52b stepped part
53, 53-1, 53-2 bearing portion
511 magnet
512, 512-1, 512-2 holder
512a, 512a-1, 512a-2 tubular portion
512b, 512b-1, 512b-2 protruding portion
512c flange portion
521 adjusting portion (one example of an adjustment part)
522 fitting portion
SL slit

The invention claimed is:

1. A rotor comprising:
   a cylindrical magnet having a bore portion into which a rotary shaft is inserted, the inner diameter of the bore portion being larger than the outer diameter of the rotary shaft;
   a holder made of resin, the holder having a tubular portion provided in the bore portion of the magnet and a protruding portion protruding from the magnet in a rotation axis direction, the holder being press-fitted onto the rotary shaft; and
   a fixed portion press-fitted onto the rotary shaft with the protruding portion interposed therebetween.

2. The rotor according to claim 1, wherein the fixed portion has an adjustment part for adjusting rotational balance of the rotor.

3. The rotor according to claim 1, wherein the holder is formed integrally with the magnet.

4. The rotor according to claim 1, wherein the protruding portion is capable of being bent in a radial direction of the rotary shaft and is in contact with the rotary shaft in such a manner that the protruding portion is bent by press-fitting of the fixed portion.

5. The rotor according to claim 4, wherein a plurality of slits extending in the rotation axis direction are formed in the protruding portion.

6. The rotor according to claim 1, further comprising a pair of bearing portions provided in a press-fitted manner at positions between which the fixed portion, the holder, and the magnet are interposed in the rotation axis direction and configured to rotatably support the rotary shaft.

7. The rotor according to claim 1, wherein the holder is made of material having a hardness lower than that of the rotary shaft.

8. The rotor according to claim 1, wherein the holder has a peripheral surface facing the rotary shaft, the peripheral surface having a surface roughness degree lower than a surface roughness degree of the bore portion of the magnet.

9. A motor comprising:
   the rotor according to claim 1; and
   a stator.

10. A method for manufacturing a rotor, the method comprising:
    a magnet-unit press-fitting step of press-fitting a magnet unit onto a rotary shaft, the magnet unit including: a cylindrical magnet having a bore portion the inner diameter of which is larger than the outer diameter of the rotary shaft, and a holder that is made of resin, the holder including a tubular portion formed in the bore portion of the magnet and a protruding portion protruding from the magnet in a rotation axis direction; and
    a fixed-portion press-fitting step of press-fitting a fixed portion onto the rotary shaft with the protruding portion interposed therebetween.

* * * * *